United States Patent [19]
Yonemura et al.

[11] Patent Number: 5,931,545
[45] Date of Patent: Aug. 3, 1999

[54] BRAKE CONTROL APPARATUS FOR A VEHICLE

[75] Inventors: Shuichi Yonemura, Anjo; Mamoru Sawada, Yokkaichi, both of Japan

[73] Assignee: Denso Corporation, Kariya-city, Japan

[21] Appl. No.: 08/772,994

[22] Filed: Dec. 23, 1996

[30] Foreign Application Priority Data

Dec. 27, 1995 [JP] Japan ..................................... 7-341456

[51] Int. Cl.$^6$ ..................................................... B60T 13/00
[52] U.S. Cl. ........................ 303/125; 303/113.4; 303/155
[58] Field of Search ................................... 303/125, 155, 303/113.4, 167, 178, 115.4, 116.2, 3, 10, 15, 20

[56] References Cited

U.S. PATENT DOCUMENTS

| | | | |
|---|---|---|---|
| 4,629,258 | 12/1986 | Resch et al. | 303/113.4 X |
| 5,261,730 | 11/1993 | Steiner et al. | 303/113.4 |
| 5,427,442 | 6/1995 | Heibel . | |

FOREIGN PATENT DOCUMENTS

| | | |
|---|---|---|
| 3444827 | 6/1986 | Germany . |
| 4102497 | 5/1992 | Germany . |
| 4325940 | 12/1994 | Germany . |
| 4324205 | 1/1995 | Germany . |
| 4-087868 | 3/1992 | Japan . |
| 7-329766 | 12/1995 | Japan . |

*Primary Examiner*—Lee W. Young
*Attorney, Agent, or Firm*—Pillsbury Madison & Sutro LLP

[57] ABSTRACT

A braking force increasing device composed of a pump and a control valve continuously increases brake-fluid pressure of wheel cylinders when a brake pedal is operated by a driver and a variation of driver's operation of the brake pedal is within a predetermined range. As a result, even when the driver keeps the brake pedal depression at a certain stroke substantially, braking force can be gradually increased. Therefore, it is not necessary for the driver to depress down the brake pedal more strongly to cause braking force to be applied to the vehicle.

14 Claims, 3 Drawing Sheets

BRAKE CONTROL APPARATUS FOR A VEHICLE

CROSS REFERENCE TO RELATED APPLICATION

This application is based upon and claims the benefit of priority of the prior Japanese Patent Application No. Hei. 7-341456 filed on Dec. 27, 1995, the contents of which are incorporated herein by reference.

BACKGROUND OF THE INVENTION

1. Field of the Invention

The present invention relates to a brake control apparatus mounted on a vehicle.

2. Description of Related Art

JP-A-7-89432 discloses a brake pressure boosting apparatus for a vehicle. In the brake pressure boosting apparatus, brake pressure is boosted to a higher level during braking operation executed in a panic situation than that in a normal situation so as to apply higher brake pressure to wheel cylinders. That is, by amplifying a driver's brake pedal stroke or depressing force with a larger assisting ratio of a brake booster than an assisting ratio under the normal operation thereof, higher brake pressure is attained to generate at a master cylinder.

In general, the larger reaction force from a brake pedal is, the larger burden of a driver becomes when the driver depresses the brake pedal further resisting this reaction force. Therefore, it is difficult for the driver to depress the brake pedal further under a panic situation or the like due to this burden. In the conventional brake pressure boosting apparatus, because the assisting ratio of the brake booster is just increased in a panic situation, the driver's burden caused by reaction force from the brake pedal can not be lightened. Thus, when a female or an elderly driver is in charge of the brake pedal depression to the conventional brake pressure boosting apparatus, even though the driver intends to obtain higher braking force, it is difficult for the driver to obtain the same.

Further, when the driver depresses the brake pedal in order to pull the vehicle up to his targeted point, he can depress the brake pedal strongly only in an initial braking operation before he begins to feel reaction force from the brake pedal. However, if reaction force receiving from the brake pedal becomes large due to the fact that it was strongly depressed down, the driver is apt to release the depressing of the brake pedal more or less against his wish to stop the vehicle. This could happen in a braking situation close to an urgent braking. In this instance, the driver can only obtain a lower braking force than expected. As a result, the distance required before the stoppage of the vehicle is prone to lengthen with respect to his targeted point against his estimation.

SUMMARY OF THE INVENTION

In light of the above-mentioned problems, the present invention has an object of providing brake control apparatus for a vehicle, which can generate a high braking force even when a driver's operation amount of a braking operating member decreases to some extent.

In order to solve the above-mentioned problems, the present invention adopts a braking force increasing device. This braking force increasing device continuously increases braking force when a braking operating member is operated by a driver and a variation of driver's operation of the braking operating member is within a predetermined range. For example, when the driver operates a brake pedal to apply brake force to a vehicle, the brake pedal functions as the braking operating member. The variation of driver's operation of the brake pedal can be detected based on an output signal from a brake pedal stroke sensor or a pressure sensor for detecting brake pressure generated by a pressure generating device such as a master cylinder, which generates brake pressure in response to a depression of the brake pedal.

Due to the braking force increasing device, for example, even when the driver keeps the brake pedal depression at a certain stroke substantially, braking force can be gradually increased. Therefore, in this case, it is not necessary for the driver to depress down the brake pedal more strongly to cause braking force to be applied to the vehicle.

If a deceleration of a vehicular body, a brake pedal stroke or a fact whether the vehicle is in braking state is detected, the situations that it is an urgent braking, it is a braking operation under a panic situation and it is to pull the vehicle up to a targeted point can be estimated. As a result, the conditions of the vehicle as well as of the driver suitable for increasing braking force can be determined more appropriately.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

A first embodiment of a brake control apparatus to which the present invention is applied will be explained based on the attached drawings.

Figure 1:
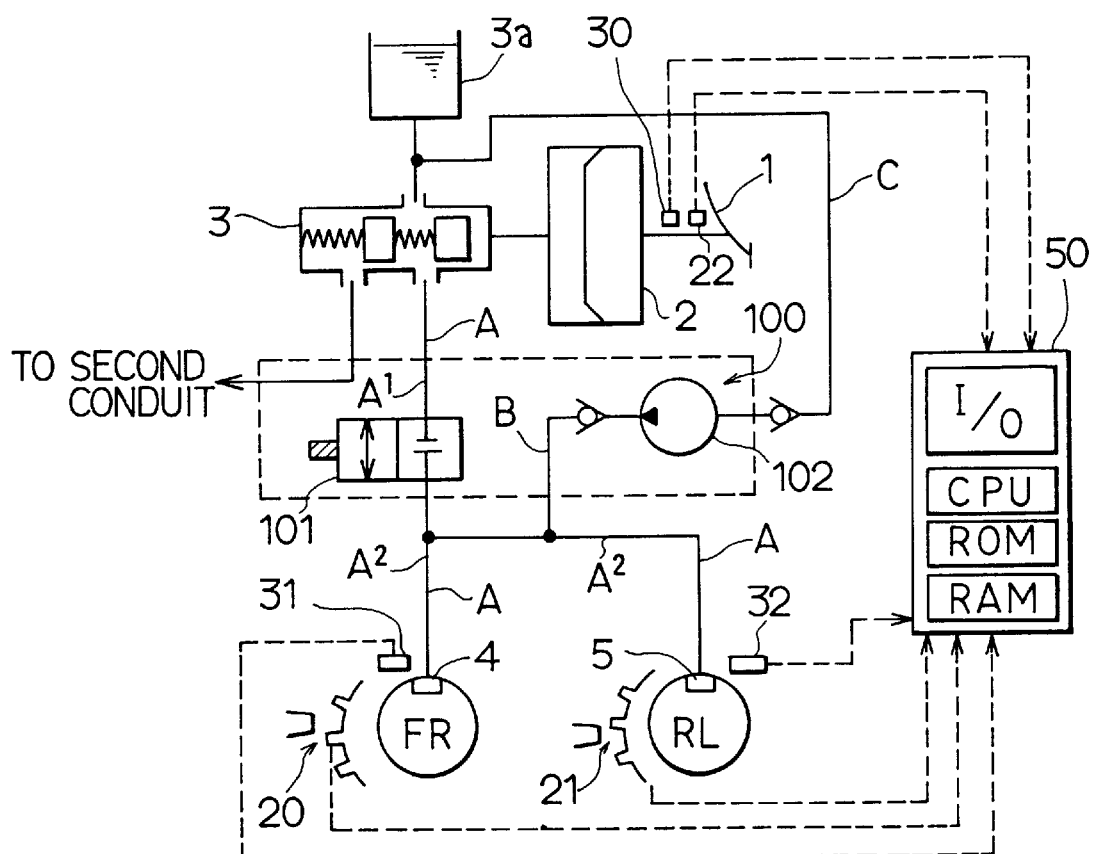
FIG. 1 is a schematic block diagram of a brake control apparatus for a vehicle according to the present invention.

FIG. 1 shows a schematic view of the first embodiment according to the present invention. In the first embodiment, the brake control apparatus is applied to a front-wheel-drive vehicle having an X-piping system in which a front-right wheel is connected to a rear-left wheel as well as a front-left wheel is connected to a rear-right wheel.

In FIG. 1, when a brake pedal 1 is depressed by a driver, braking force is generated at a vehicle. Brake pedal 1 is connected to a booster 2. Depression force applied to brake pedal 1 and a pedal stroke thereof are transmitted to booster 2. Brake pedal 1 turns on and off a brake switch 22 for illuminating a stop lamp in response to depression thereof. The illuminating of the stop lamp allows visual recognition by a driver of a vehicle to the rear or the like that the vehicle is in a braking state due to depression of brake pedal 1. A stroke sensor 30 is disposed on brake pedal 1 so as to detect a moving distance of brake pedal 1 when depressed by the driver.

Booster 2 has at least a first chamber and a second chamber. The first chamber is used as an atmospheric pressure chamber and the second chamber as a negative pressure chamber.

Negative pressure generated in an intake manifold of an engine or generated by a vacuum pump is introduced into the negative pressure chamber. Booster 2 boosts directly the driver's pedal depression force or pedal stroke by a pressure differential between the atmospheric pressure chamber and the negative pressure chamber. Booster 2 has a push rod for transmitting the boosted depression force or pedal stroke to a master cylinder 3. The push rod presses a master piston disposed in master cylinder 3 so that a master cylinder pressure PU is generated. Here, master cylinder 3 is provided with a master reservoir 3a exclusively for supplying brake-fluid into master cylinder 3 or for accumulating an excess brake fluid within master cylinder 3.

As described above, a vehicle is ordinarily provided with a brake fluid pressure generating device composed of brake pedal 1, booster 2, master cylinder 3 and the like in order to give braking force to the vehicle.

A first conduit A extending from master cylinder 3 is branched halfway. A first wheel cylinder 4 for providing braking force to a front-right wheel FR and a second wheel cylinder 5 for providing braking force to a rear-left wheel RL are connected to the both ends of the branched first conduit A. A control valve 101 is disposed in the conduit which continues to the branching point of the first conduit A from master cylinder 3. That is, control valve 101 separates first conduit A into two parts, a first conduit portion A1 which is a part from master cylinder 3 to control valve 101 and a second conduit portion A2 which is a part from control valve 101 to respective wheel cylinders 4 and 5.

A braking force generating device for generating braking force at the vehicle, is composed of brake pedal 1, master cylinder 3, first and second conduit portions A1 and A2, and first and second wheel cylinders 4 and 5.

A discharging port of a pump 102 which takes in brake-fluid from master reservoir 3a exclusively provided with mater cylinder 3 is connected to second conduit portion A2. Here, a check valve is provided respectively with a discharging conduit B for connecting the discharging port of pump 102 and second conduit portion A2 and with an intake conduit C for connecting an intake port of pump 102 and master reservoir 3a. The check valves prevent brake-fluid from flowing reversely toward master reservoir 3a from pump 102 itself as well as by way of pump 102 from second conduit portion A2.

Wheel cylinder pressure sensors 31 and 32 are provided with first and second wheel cylinders 4 and 5 respectively so that brake-fluid pressure loaded on each wheel cylinder can be detected. Here, wheel cylinder pressure sensors 31 and 32 are not necessarily provided at first and second wheel cylinders 4 and 5, but can be provided at points in second conduit portion A2 where the equivalent brake-fluid pressures can be detected as in the respective wheel cylinders 4 and 5, for example.

Wheel speed sensors 20 and 21 such as electromagnetic pickup type wheel speed sensor are provided with the front-right wheel FR and rear-left wheel RL. Wheel speed signals detected by wheel speed sensors 20 and 21, outputs from each wheel cylinder pressure sensors 31 and 32, an output from a stroke sensor 30 and an output from brake switch 22 are sent to an electronic control unit (ECU) 50 for an execution of computation as shown in a flow chart in FIG. 2, which will be described later.

Electronic control unit 50 is composed of a micro computer having a CPU, a ROM, a RAM, an I/O interface and so on. In addition, electronic control unit 50 processes wheel speed signals detected by wheel speed sensors 20 and 21 as previously described, as well as controls operations of control valve 101 and pump 102 by feeding control signals thereto.

In the brake control apparatus of the first embodiment, an increasing device 100 for increasing braking force by increasing wheel cylinder pressures loaded on wheel cylinders 4 and 5 respectively under predetermined conditions are composed of control valve 101 and pump 102, and controlled by electronic control unit 50.

Here, in the first embodiment, a two-port, two-way valve is adopted as control valve 101 for switching ports due to the movement of its valve body upon an energization of solenoid disposed therein when the electricity is supplied thereto based on signals from electronic control unit 50. The position of control valve 101 shown in FIG. 1 indicates a state in which the ports of control valve 101 are interrupted when an electricity is supplied based on the control signal from electronic control unit 50. The ports of the same are communicated under the normal braking mode when the electricity is not supplied.

In the previous description, only the structure of first conduit A is explained. However, since the same structure can be adopted to the second conduit connecting a front-left wheel cylinder with rear-right wheel cylinder, a detailed explanation is omitted.

Next, the content of arithmetic processing of electronic control unit 50 will be explained based on the flow chart in FIG. 2.

Figure 2:
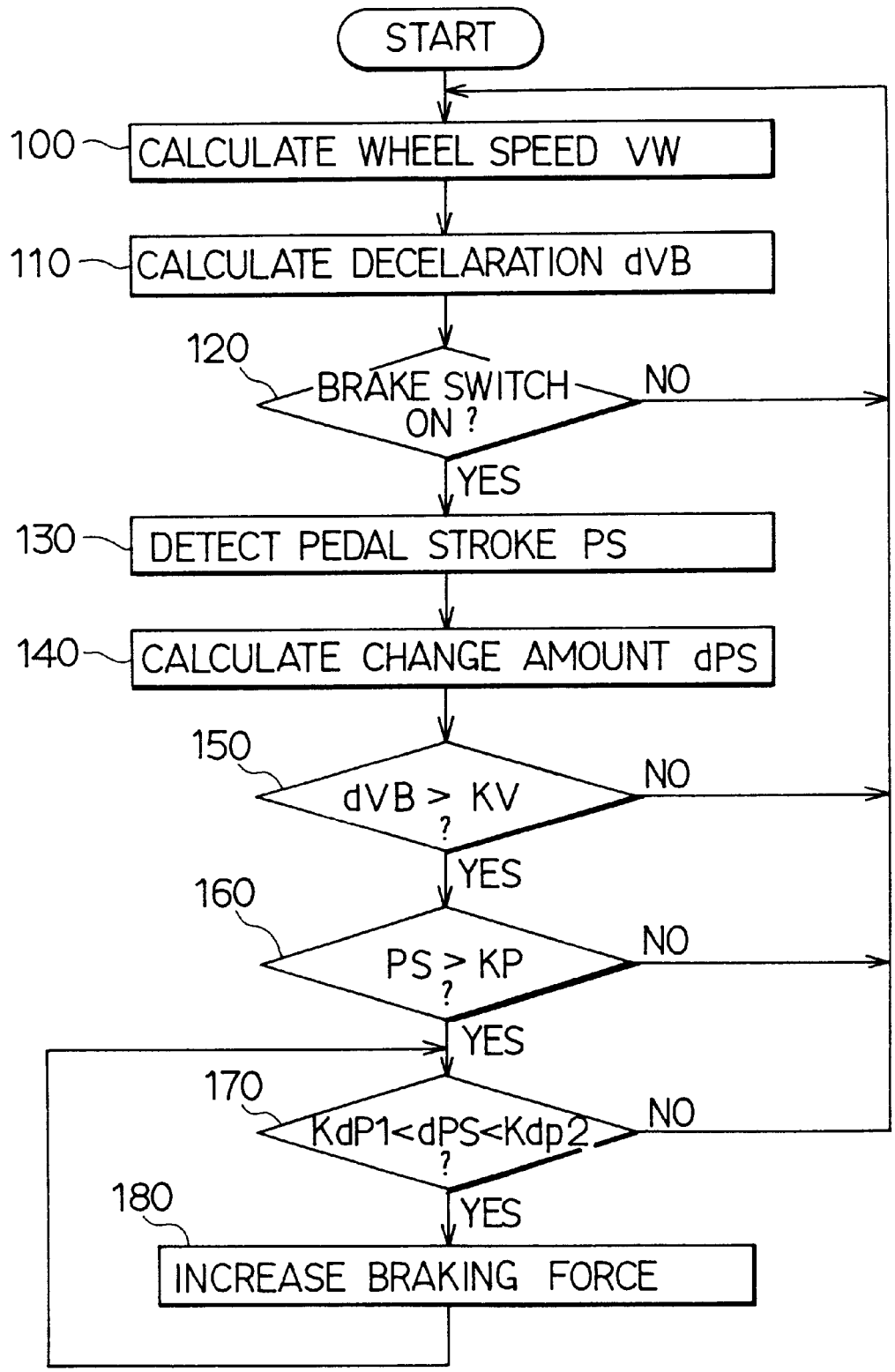
FIG. 2 is a flow chart explaining the content of arithmetic processing performed by an electronic control unit 50.

In the flow chart in FIG. 2, it begins with turning-on of an ignition switch by a driver or with similar actions. Flags and computed values which are utilized in the operational processing are initialized accordingly. Firstly, each wheel speeds VW are calculated based on outputs from previously described wheel speed sensors 20 and 21 at a step 100. Next, at a step 110, a vehicular body speed VB is calculated based on wheel speeds VW and so on. Here, either a maximum value or an average value of wheel speeds VW can be adopted as a vehicular body speed VB.

At a step 120, whether brake switch 22 is turned on or not is determined. Here, if the driver did not depress brake pedal 1 and the vehicle is not in the braking mode, which means brake switch 2 is turned off, the processing is brought back to step 100 so as to repeat the calculation of wheel speeds VW and the like. At step 120, in case that the vehicle is in the braking mode and brake switch 22 is turned on, the processing advances to a step 130.

At step 130, a pedal stroke PS which is an amount of pedal manipulation by the driver, is calculated based on the output from stroke sensor 22. Next, at a step 140, a pedal stroke change amount dPS which is a changed amount of manipulation of brake pedal 1, is calculated.

At a step 150, whether a vehicular body deceleration dVB is larger than a predetermined value KV or not is determined. Predetermined value KV can be set to a larger value to some extent, for example, 0.4 G which is the deceleration value reached at the time when the driver brakes the vehicle abruptly. Here, if the vehicular body deceleration dVB is determined to be smaller the predetermined value KV, the processing is brought back to step 100. If the vehicular body deceleration dVB is determined to be larger than the predetermined value KV, the processing is brought forward to a step 160.

At step 160, whether a pedal stroke PS is larger than a predetermined value KP is determined. That means whether the driver depresses brake pedal 1 to give braking force more than the predetermined value is determined. For example, pedal stroke PS can be utilized in order to determine whether the driver requires only the decrease of vehicular speed or intends to pull the vehicle up to a targeted point.

At step 160, if the pedal stroke PS is determined to be smaller than a predetermined value KP, the processing is brought back to step 100. If the pedal stroke PS is determined to be larger than predetermined value KP, the processing is brought forward to a step 170. At step 170, whether pedal stroke change amount dPS is within a predetermined range (Kdp1 <dPS<Kdp2) is determined. In other words, under the situation of brake pedal 1 having being depressed, a determination whether the depression of brake pedal 1 is being maintained at a constant value approximately, is being increased further or is being released, is made.

At step 170, if pedal stroke change amount dPS is determined to be out of the predetermined range, which means that the stroke of brake pedal 1 is determined to be changing, the processing is brought back to step 100. If the stroke of brake pedal 1 is determined to be substantially constant, the processing is brought forward to a step 180 so as to activate increasing device 100.

That is, if brake pedal 1 has been depressed and the depression of brake pedal 1 is maintained by the driver, at step 180, the brake-fluid pressure loaded on first and second wheel cylinders 4 and 5 are increased by increasing device 100 so that the braking force of the vehicle is increased. The deceleration of the vehicle is increased accordingly.

Figure 3:
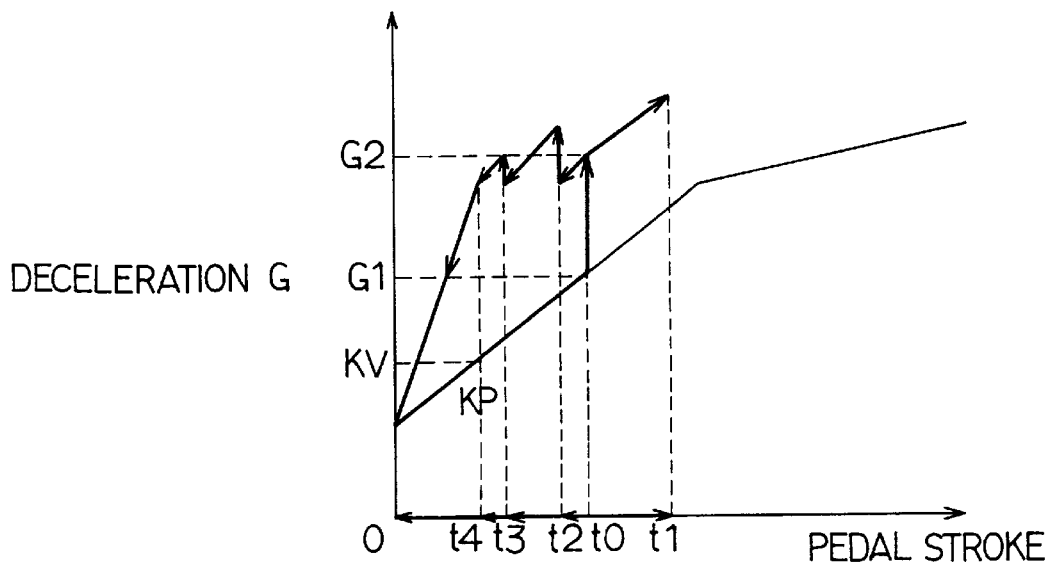
FIG. 3 is a graph showing the function of the brake control apparatus for a vehicle according to the present invention.

Functions and effects in the above described flow chart is explained based on FIG. 3.

In FIG. 3, it is assumed that the vehicular body deceleration dVB has reached a value G1 which is larger than the predetermined value KV due to the driver's manipulation depressing brake pedal 1 gradually during time 0 and time t0. If it is also assumed that the depression of brake pedal 1 is maintained and the pedal stroke hardly changes, the vehicular body deceleration dVB increases from a deceleration G1 to a deceleration G2 during the same period of time, since the braking force is increased by increasing device 100. Therefore, when there is reaction force from brake pedal 1, even if the driver holds the pedal depression without further depressing, braking force is increased by increasing device 100 gradually so as to cause the vehicular body deceleration dVB to gain. In other words, since the gained braking force brings an increase of the deceleration, even when the stroke of brake pedal 1 is kept as it is, large braking force is secured without requiring the driver to depress brake pedal 1 hard.

Here, it is assumed that the driver depresses brake pedal 1 further during time t0 and time t1. Since the pedal stroke change amount dPS becomes larger than the predetermined value Kdp1, increasing device 100 is not activated. However, an increase of wheel cylinder pressure is executed in accordance with the depression of brake pedal 1 so that braking force corresponding to the pedal depression is added.

It is also assumed that the driver releases his pedal depression a little from time t0 to time t2. The wheel cylinder pressure is deceased in accordance with this pedal manipulation so that the braking force is decreased and so as vehicular body deceleration dVB.

However, it is assumed that this releasing manipulation of the depressed pedal from time t0 to time t2 has been brought from an awkward manipulation of brake pedal 1 by the driver or from a rebounding movement of brake pedal 1 caused by the fact that the driver yields to the reaction force from brake pedal 1, but is not intended by the driver for the purpose of decreasing braking force. Also, it is assumed that the driver once again holds the pedal depression at time t2. As a result, increasing device 100 increases the brake-fluid pressure loaded on wheel cylinders 4 and 5 to increase brake force when the pedal depression is held by the driver. The increasing of brake fluid pressure is lasted as long as the state in which the deceleration dVB is larger than the predetermined value KV, the pedal stroke PS is larger than the predetermined value KP and brake pedal 1 is maintained to be depressed approximately at a constant value, is fulfilled. Therefore, even in a panic situation, as long as the deceleration dVB is larger than the predetermined value KV and the pedal stroke PS is larger than the predetermined value KP, the deceleration dVB is gained through the increased braking force. That is, even though the driver have released the depression of brake pedal 1 to some extent, when the depression of brake pedal 1 is maintained at a certain value afterward, large deceleration of the vehicle can be assured.

Likewise, if the driver releases the depression of brake pedal 1 during time t2 and time t3, the deceleration dVB decreases while brake pedal 1 is on the move. However, if the depression of brake pedal 1 is maintained once again at a certain value at time t3, braking force increases and the deceleration dVB is gained. In this way, under the condition in which the predetermined conditions are satisfied and a repetition of depressing and releasing of brake pedal 1 is made additionally, large braking force can be always obtained since braking force is increased by increasing device 100 at the time of the holding of the pedal depression.

Here, if pedal stroke PS becomes smaller than the predetermined value KP at time t4, this system determines that panic braking is terminated or the driver foresees the certainty of pulling the vehicle up to the targeted point. Accordingly, the activation of increasing device 100 is prohibited and the wheel cylinder pressure is decreased normally by adjusting the wheel cylinder pressure in correspondence with the manipulative state of brake pedal 1. When the depression of brake pedal 1 is released, the system goes back to a normal braking mode perfectly so as to bring both the wheel cylinder pressure and the braking force to zero.

As described, according to the brake control apparatus of the first embodiment, if the pedal stroke is determined to be substantially constant, braking force applied to the vehicle is increased gradually by increasing the brake-fluid pressure loaded on wheel cylinders with a predetermined increasing ratio, under the condition wherein both the deceleration and the pedal stroke are larger than the predetermined values, respectively. Under the same condition, if brake pedal 1 is released or depressed further, the braking force either increases or decreases in accordance with the pedal manipulation. Therefore, once the driver depresses brake pedal 1 hard enough to gain large vehicular body deceleration dVB, large braking force can be obtained by simply holding the pedal depression. Also, even if the driver is releasing the pedal depression gradually, an intermittent manipulation of holding the pedal depression enables the driver to retain the braking force at high level. In addition, a repetition of releasing and depressing of brake pedal 1 enables the driver to obtain substantially constant braking force. Therefore, a burden of the driver is lessened compared with the conventional apparatus in which the driver is required to keep the pedal depressed hard.

The present invention is not limited to the above-mentioned first embodiment, but also can be varied as stated in the following.

Figure 4:
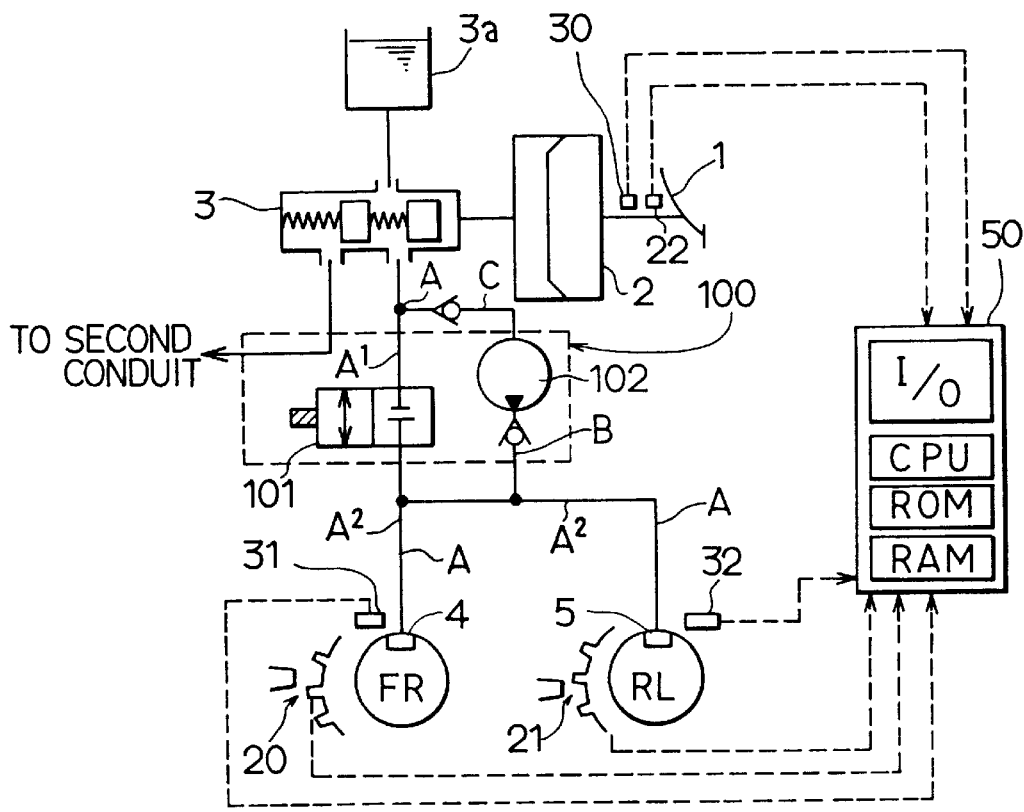
FIG. 4 is a schematic block diagram of a brake control apparatus for a vehicle according to the other embodiments.

For example, in the above mentioned first embodiment, brake fluid is taken in by pump 102 from master reservoir 3a when increasing device 100 shown in FIG. 1 is activated at step 180. However, not being limited to this, as shown in FIG. 4 for example, wheel cylinder pressures PW1 and PW2 can be increased by taking in brake fluid from first conduit portion A1 and discharging the same to second conduit portion A2. In this case, since the amount of the brake-fluid within master cylinder 3 and first conduit portion A1 is decreased, the master cylinder pressure PU is decreased as well. Therefore, the driver can depress brake pedal 1 hard with a small burden with respect to his depressing force without receiving a large pedal reaction force.

Also, in the above-mentioned first embodiment, the two-way valve is adopted as control valve 101 of increasing device 100. However, a structure for keeping the pressure of second conduit portion A2 or the wheel cylinder pressure, both are increased by increasing device 100 at step 180, can be used instead of the two-way valve. Namely, for example, a metering valve or a differential pressure regulating valve set with a relatively large differential pressure can be used. In other words, the retention of the pressure in second conduit portion A2 is achieved not only by prohibiting the flow of brake-fluid from the side of wheel cylinders 4 and 5 to the side of master cylinder 3, but also by simply limiting the flow of the brake-fluid from the side of wheel cylinders 4 and 5 to the side of mater cylinder 3.

Further, in the above-mentioned first embodiment, increasing device 100 is activated at step 180 only when both the vehicular body deceleration dVB and the pedal stroke PS are larger than the predetermined values, respectively. However, increasing device 100 can be set so as to be activated always when the vehicle is in a braking mode.

What is claims is:

1. A brake control apparatus for a vehicle comprising:
   a braking operating member which is operated by a driver to apply braking force to said vehicle, wherein the driver receives a reaction force corresponding to an operating amount of said braking operating member therefrom;
   a braking force generating device for generating a braking force in said vehicle based on said operating amount of said braking operating member by the driver;
   determining means for determining whether said operating amount of said braking operating member is substantially held constant or not; and
   an increasing device for increasing braking force generated by said braking force generating device as long as said operating amount is substantially held constant.

2. A brake control apparatus for a vehicle according to claim 1, wherein:
   said increasing device continuously increases braking force with a predetermined increasing rate.

3. A brake control apparatus for a vehicle according to claim 1, wherein said braking force generating device includes;
   a brake-fluid pressure generating device for generating brake-fluid pressure in accordance with said operating amount of said braking operating member;
   a wheel braking force generating device for generating braking force in a wheel upon receipt of said brake-fluid pressure; and
   a conduit for communicating said brake-fluid pressure generating device with said wheel braking force generating device.

4. A brake control apparatus for a vehicle according to claim 3, wherein said increasing device includes:
   a flow regulating member disposed in said conduit, for regulating a flow of braking-fluid from a side of said wheel braking force generating device to a side of said brake-fluid pressure generating device, and
   said increasing device discharges pressurized brake-fluid to said conduit provided between said wheel braking force generating device and said flow regulating member.

5. A brake control apparatus for a vehicle according to claim 3, wherein:
   said determining means determines whether said operating amount is substantially held constant or not based on a variation of said brake-fluid pressure in said brake-fluid pressure generating device.

6. A brake control apparatus for a vehicle according to claim 3, wherein:
   said braking operating member includes a brake pedal operated by the driver; and
   said determining means determines whether said operating amount of said braking operating member is substantially held constant or not based on an operating amount of said brake pedal.

7. A brake control apparatus for a vehicle according to claim 3, wherein:
   said wheel braking force generating device causes deceleration to said vehicle in accordance with said brake-fluid pressure; and
   said increasing device continuously increases deceleration of said vehicle by increasing said brake-fluid pressure successively as long as said determining means determines that said operating amount is substantially held constant.

8. A brake control apparatus for a vehicle according to claim 1, further comprising:
   a vehicular body deceleration detecting device for detecting vehicular body deceleration of said vehicle, wherein said increasing device increases braking force when said vehicular body deceleration detecting device detects vehicular body deceleration larger than a predetermined value and said determining means determines that said operating amount is substantially held constant.

9. A brake control apparatus for a vehicle according to claim 1, wherein:
   said increasing device increases braking force when said operating amount of said braking operating member is larger than a predetermined value and is substantially held constant.

10. A brake control apparatus for a vehicle according to claim 1, further comprising:
    a braking state detecting device for detecting whether said vehicle is in a braking state,
    wherein said increasing means increases braking force when said braking state detecting device detects that said vehicle is in a braking state and said determining means determines that said operating amount is substantially held constant.

11. A brake control apparatus for a vehicle according to claim 1, further comprising:

a vehicular body deceleration detecting device for detecting vehicular body deceleration of said vehicle; and prohibiting means for prohibiting that said increasing device increases braking force when said vehicular body deceleration detecting device detects vehicular body deceleration lower than a predetermined value.

12. A brake control apparatus for a vehicle according to claim 1, further comprising:

prohibiting means for prohibiting that said increasing device increases braking force when said operating amount of said braking operating device is smaller than a predetermined value.

13. A brake control apparatus for a vehicle according to claim 1, further comprising:

a braking state detecting device for detecting whether said vehicle is in a braking state; and prohibiting means for prohibiting said increasing device from increasing braking force when said braking state detecting device detects that said vehicle is out of a braking state.

14. A brake control apparatus for a vehicle according to claim 1, further comprising:

said increasing device stops increasing braking force when said determining means determines that said operating amount of said braking operating member substantially changes; and said braking force generating device adjusts braking force which has been increased by said increasing device in accordance with said operating amount of said braking operating member.

* * * * *